Dec. 14, 1965   R. M. VAUGHN   3,222,977
THREE PIECE BLIND FASTENER
Filed Nov. 5, 1963

INVENTOR.
RUDOLPH M. VAUGHN
BY *Elliott & Pastoriza*
ATTORNEYS

3,222,977
THREE PIECE BLIND FASTENER
Rudolph M. Vaughn, 611 Lido Park Drive,
Newport Beach, Calif.
Filed Nov. 5, 1963, Ser. No. 321,599
2 Claims. (Cl. 85—72)

This invention relates generally to blind fasteners and more particularly to an improved three piece blind fastener for enabling the securing together of members from one side.

Presently known three piece blind fasteners comprise a bolt having an enlarged head, an elongated nut having an enlarged head, and a sleeve adapted to be received over the bolt and positioned between the bolt head and the end of the nut. This assembly is arranged to be passed through registered openings between two members to be secured together. The nut is then held against rotation and the bolt is threaded into the nut thereby urging the sleeve over the end of the nut causing a radial expansion and deformation thereof so that it will engage the blind side of the openings. The protruding end of the bolt is then broken off so that there may be provided a flush surface.

In fasteners of the foregoing type, there exists the possibility of the bolt head passing into the upper end of the sleeve rather than urging the upper end of the sleeve along the bolt to effect radial expansion of the lower end. This risk has been minimized to some extent by undercutting the head portion of the bolt to provide a pocket to receive the annular end of the sleeve. This practice, however, requires an extra machining operation in the manufacture of the bolt itself.

In addition to the foregoing, in order to rotate the bolt to thread into the nut and thus urge the sleeve against the blind side of the opening, there are provided wrench flats beyond the break neck point of the bolt. However, once the bolt has been broken off to provide a flush surface there is no means for further rotating the bolt. Accordingly, it is not possible to check torque or integrity of the fastening after the fastening has been completed. Furthermore, it is difficult to disassemble the fastener in the event it is desired to remove the same without drilling out the entire bolt structure.

A desirable feature in a three piece blind fastener is to provide a locking of the bolt to the nut after tightening has been effected. With sleeve structures as presently designed, a desired locking is not always insured and some auxiliary means must be provided.

With all of the foregoing in mind, it is a primary object of this invention to provide an improved three piece blind fastener in which the foregoing problems are minimized.

More particularly, it is an object to provide a three piece blind fastener incorporating a uniquely designed sleeve such that it will be secured to the underside of the bolt head without the necessity of machining out the underside of the bolt head so that manufacture of the bolt is simplified.

Another object is to provide an improved three piece blind fastener in which a torque test may be effected on the fastener after the same has been secured to thereby provide a simple means of determining the integrity of the fastening structure.

Still another object is to provide an improved three piece blind fastener in which a secure lock between the threads of the bolt and nut is insured after the same have been secured in position.

Briefly, these and many other objects and advantages of this invention are attained by providing a blind fastener comprising a bolt, nut, and sleeve. In accordance with a feature of the invention, the bolt includes an enlarged head defining an annular shoulder facing in the direction of the end of the bolt and lying in a plane normal to the axis of the bolt. The sleeve includes chamfered ends such that the end of the sleeve engaging the underside of the head when the head is drawn down against the sleeve will cause a yielding of the metal in the sleeve to provide a secure engagement of the upper end of the sleeve with the underside of the bolt head. The lower chamfered portion on the other hand results in a wedging action about the periphery of the blind side of the opening between this lower end and the tapered portion of the nut over which the sleeve is expanded. These wedging actions serve to effect a locking of the sleeve to the nut and bolt after the assembly has been secured.

The shank of the bolt itself includes wrench flats at its far end which are extended so as to pass beyond the break neck groove so that once the end of the bolt has been broken off there still remains wrench flats enabling torque checks to be effected or enabling the bolt to be unthreaded from the nut and thus the fastener disassembled.

A better understanding of the invention will be had by now referring to a preferred embodiment thereof as illustrated in the accompanying drawings, in which.

Figure 1:
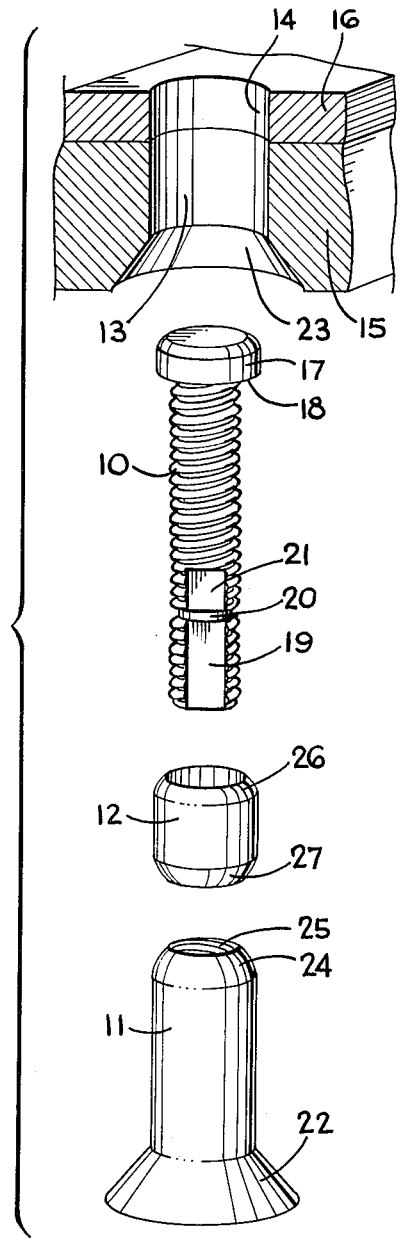
FIGURE 1 is an exploded perspective view illustrating the components making up the improved three piece fastener of this invention.

Referring first to FIGURE 1, the fastener comprises a bolt 10, elongated nut 11, and sleeve 12. These elements are arranged to be passed through registered openings 13 and 14 in first and second members 15 and 16 to be secured together.

As shown, the bolt 10 includes an enlarged head 17 defining an annular shoulder 18 at one end and includes first flattened areas falling within the diameter of said bolt to define wrench flats 19 at its other end. An annular break neck groove 20 is provided in the shank of the bolt 10 and additional flattened areas defining wrench flats 21 extend towards the head from the break neck groove 20.

Referring now to the nut 11, it will be noted that the nut includes an enlarged head portion 22 arranged to seat within a flared entrance portion 23 in the opening 13 of the member 15. The other end of the nut 22 is externally tapered as at 24, the purpose for which will become clearer as the description proceeds. The elongated tubular portion of the nut 11 is internally threaded as indicated at 25.

The third component of the fastener in the form of the sleeve 12 is arranged to be loosely telescoped over the shank of the bolt 10. This component has its respective ends chamfered as at 26 and 27 to define tapered annular end portions.

Figure 2:
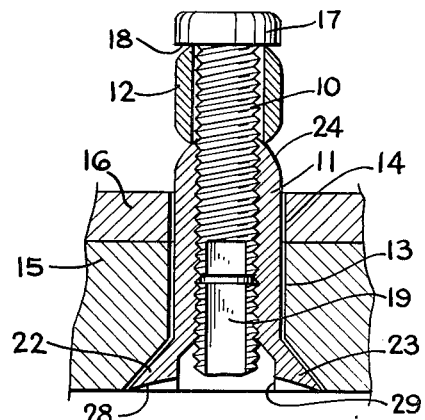
FIGURE 2 is an elevational view partly in cross-section of the assembled elements preparatory to effecting a blind fastening.

Referring now to FIGURE 2, the blind fastener is shown in assembled condition wherein the sleeve 12 has been inserted over the bolt shank 10 so that its upper end seats against the underside 18 of the head 17 of the bolt. The nut 11 in turn has been threaded up until its upper tapered end is received within the lower end of the sleeve 12. The components as assembled are then passed as a unit through the registered openings 13 and 14 of the members 15 and 16 until the enlarged head 22 on the nut seats in the flared portion of the opening 13 as indicated at 23. The various parts will thus be in a position as illustrated in FIGURE 2.

To effect a fastening of the members 15 and 16 together, the head portion 22 of the nut is provided with driving slots such as indicated at 28 together with an enlarged central counterbore cavity 29 from which protrudes the wrench flats 19 of the end of the bolt 10. The nut 11 is held stationary by any suitable tool received within the slots 28 and the bolt 10 is then threaded by another tool engaging the wrench flats 19. As the bolt 10 is threaded into the nut 11, the head 17 will bear downwardly against the sleeve 12 causing the lower end of the sleeve 12 to expand over the tapered portion 24 at the upper end of the nut.

Figure 3:
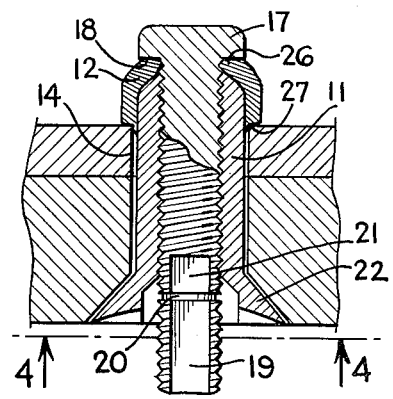
FIGURE 3 is a view similar to FIGURE 2 but illustrating the relative positions of the components making up the fastener after the same has been secured; and, FIGURE 4 is a fragmentary plan view of the nut head portion of the fastener taken in the direction of the arrows 4—4 of FIGURE 3.

FIGURE 3 illustrates the final result of this expansion of the sleeve 12 and as shown, the upper tapered end of the sleeve has been deformed by the underside of the shoulder 18 adjacent the shank portion of the bolt 10. Thus, the metal in the sleeve 12 has been caused to yield at its inner portions as a consequence of the upper tapered or chamfered surface 26 thereby insuring that the sleeve is seated against the shoulder 18 and will not telescope over the end of the head 17. In addition, the yielding of the metal in the sleeve locks the sleeve to the bolt threads immediately under the shoulder 18.

Further, the lower chamfered portion 27 of the sleeve has been wedged in the peripheral portion of the opening 14 between the end portion of the nut 11 and this peripheral portion of the opening. Thus, the chamfer aids in causing the metal of the sleeve 12 to flow over the tapered surface 24 of the nut 11 and effect a relatively flat 360-degree seating about the periphery of the blind side of the opening. As a consequence of the wedging action due to the lower chamfered portion 27, the lower end of the sleeve is effectively locked to the nut. The upper chamfered portion, as stated, is wedged against the threads of the bolt to effect a secure locking of the nut with respect to the threads of the bolt.

After the sleeve 12 has been seated against the periphery of the blind side of the opening as shown in FIGURE 3, the protruding portion of the bolt 10 may be broken off at the annular groove 20. There is thus provided a flush surface at the entrance end of the openings. After breaking off the end portion of the bolt, a suitable filler such as aluminum may be inserted in the slot and cavity portion of the nut head 22 to provide an aerodynamically smooth surface. However, prior to filling these cavities to provide such a smooth surface, the additional wrench flats 21 may be employed to effect a torque check on the bolt and thus determine the integrity of the fastening.

Figure 4:
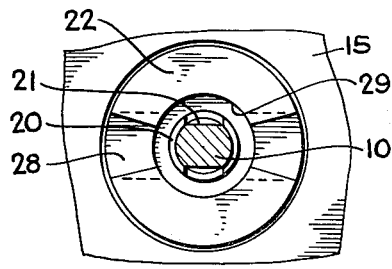

The torque test may be effected by the same wrench used in tightening up the bolt 10 and as illustrated in FIGURE 4, may easily be inserted to engage the flats 21 as a consequence of the enlarged cavity portion 29.

As a further consquence of the provision of the additional wrench flats 21, the fastener may be readily disassembled by simply inserting a tool to engage the flats 21 and then unthreading the bolt 10 from the nut 11. Thus, even though the bolt may be broken off at the break neck groove 20, the additional wrench flats will enable the device to be disassembled.

From the foregoing description, it will be evident that the present invention has provided a greatly improved three piece blind fastener wherein secure locking of the sleeve to the upper head portion of the bolt as well as secure locking of the nut through the medium of the sleeve to the bolt threads is realized. Moreover, as a result of the additional wrench flats in the enlarged counterbore cavity in the nut head 22, proper torque tests may be carried out on the fastener and the fastener itself may be readily disassembled without having to drill out the structure.

Various modifications falling clearly within the scope and spirit of this invention will occur to those skilled in the art. The three piece blind fastener is therefore not to be thought of as limited to the one embodiment set forth merely for illustrative purposes.

What is claimed is:

1. A three piece blind fastener unit comprising, in combination: a bolt, an elognated nut, and a sleeve, said bolt having an enlarged head defining an annular shoulder facing towards the end of said bolt, said nut comprising an elongated tubular member with internal threads for threading to said bolt, and said sleeve comprising a tubular member having exterior chamfered ends, whereby said sleeve may be telescoped over said bolt so that one of said chamfered ends engages said annular shoulder, and said nut threaded up on said bolt until it engages under the opposite chamfered end of said sleeve, and the assembled unit passed through registered openings in first and second members to be fastened together, further threading of said nut causing said sleeve to expand over said nut so that said opposite chamfered end engages the interior and adjacent exterior periphery of said registered openings on one side whereby said members are locked together by said unit, an end portion of said bolt including an annular groove to define a weakened area so that said bolt may be broken off at said groove after said fastener has been secured, said end portion including flattened areas falling within the diameter of said bolt to define wrench flats on either side of said groove so that after breaking off of said bolt at said groove there remain wrench flats to enable torgue testing of said fastener to be carried out and to enable said bolt to be backed out of said nut if it is desired to disassemble said fastener.

2. A fastener according to claim 1, in which said nut includes an enlarged head having driving slots thereon, the central portion of said head being counterbored to define an enlarged cavity providing access to said wrench flats.

References Cited by the Examiner

UNITED STATES PATENTS

| 2,298,203 | 10/1942 | Eklund. |
| 2,765,699 | 10/1956 | La Torre. |
| 3,129,630 | 4/1964 | Wing et al. |

FOREIGN PATENTS

| 633,370 | 12/1961 | Canada. |
| 681,974 | 10/1952 | Great Britain. |
| 684,821 | 12/1952 | Great Britain. |
| 898,026 | 6/1962 | Great Britain. |

EDWARD C. ALLEN, *Primary Examiner.*